US009466219B1

(12) United States Patent
Stefani et al.

(10) Patent No.: US 9,466,219 B1
(45) Date of Patent: Oct. 11, 2016

(54) UNMANNED VEHICLE MISSION PLANNING, COORDINATION AND COLLABORATION

(71) Applicant: ROCKWELL COLLINS, INC., Cedar Rapids, IA (US)

(72) Inventors: Rolf R. Stefani, West River, MD (US); James Gary Cooper, Jr., Annapolis, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 97 days.

(21) Appl. No.: 14/318,569

(22) Filed: Jun. 27, 2014

(51) Int. Cl.
*G08G 5/00* (2006.01)
*G05D 1/00* (2006.01)

(52) U.S. Cl.
CPC .......... *G08G 5/0039* (2013.01); *G05D 1/0027* (2013.01); *G08G 5/0026* (2013.01)

(58) Field of Classification Search
CPC ............. G08G 5/0004; G08G 5/0013; G08G 5/0017; G08G 5/0026; G08G 5/003; G08G 5/0034; G08G 5/0039; G08G 5/0043; G08G 5/006; G08G 5/0069; G05D 1/0027
See application file for complete search history.

(56) References Cited

U.S. PATENT DOCUMENTS 8,370,057 B1 * 2/2013 Herwitz ................ G01S 13/003
340/903
8,977,481 B1 * 3/2015 Downs ................ G08G 5/0017
701/120
2001/0044697 A1 * 11/2001 Kageyama ............ B60W 40/04
701/301
2009/0219393 A1 * 9/2009 Vian et al. ............. G07C 5/008
348/144

(Continued)

OTHER PUBLICATIONS

U.S. Appl. No. 13/792,255 to Stefani et al., filed Mar. 11, 2013.

(Continued)

*Primary Examiner* — Jerrah Edwards
*Assistant Examiner* — Tamara Weber
(74) *Attorney, Agent, or Firm* — Ronald E. Prass, Jr.; Prass LLP

(57) ABSTRACT

A system and method are provided for implementing multi-mission tracking and re-tasking for a plurality of unmanned vehicles from a central location to provide mission deconfliction and mission modification in an operating environment, including an evolving and moving operating environment, to effectively employ the plurality of locally-operated unmanned vehicles. A mission controller, operating from a centralized location, takes a provided graphical situational awareness a step further in creating, modifying, or deleting/suspending missions for one or multiple unmanned vehicles to carry out, and then to transmit the proposed mission changes to the deployed unmanned vehicle operators for validation, acceptance, and execution. A non-voice communication capability is provided for a mission controller in a centralized location to generate and transmit new mission details in a graphical format to translate to each of a plurality of fielded unmanned vehicle operators, each controlling one or more unmanned vehicles for execution.

21 Claims, 4 Drawing Sheets

(56) References Cited

U.S. PATENT DOCUMENTS

| | | | |
|---|---|---|---|
| 2009/0316755 A1* | 12/2009 | Collette et al. | G05D 1/0044 375/133 |
| 2010/0066604 A1* | 3/2010 | Limbaugh | G08G 5/0013 342/357.31 |
| 2010/0279649 A1* | 11/2010 | Thomas | G06Q 50/26 455/404.2 |
| 2010/0305778 A1* | 12/2010 | Dorneich | G05D 1/0044 701/2 |
| 2010/0315281 A1* | 12/2010 | Askelson | G01S 7/003 342/30 |
| 2014/0018979 A1* | 1/2014 | Goossen et al. | G08G 5/0034 701/3 |
| 2014/0142785 A1* | 5/2014 | Fuentes | G05D 1/0011 701/2 |
| 2014/0236388 A1* | 8/2014 | Wong et al. | B64C 39/024 701/2 |
| 2014/0249693 A1* | 9/2014 | Stark et al. | B64C 39/024 701/2 |
| 2015/0379874 A1* | 12/2015 | Ubhi | G01S 5/0027 701/3 |
| 2016/0101855 A1* | 4/2016 | Stefani | B64C 39/024 701/2 |

OTHER PUBLICATIONS

U.S. Appl. No. 13/792,259 to Stefani et al., filed Mar. 11, 2013.

* cited by examiner

UNMANNED VEHICLE MISSION PLANNING, COORDINATION AND COLLABORATION

This application is related to U.S. patent application Ser. No. 13/792,255, entitled "SYSTEMS AND METHODS FOR SMALL UNMANNED AIRCRAFT SYSTEMS (sUAS) TACTICAL TRACKING AND MISSION DATA ACQUISITION," filed on Mar. 11, 2013, and U.S. patent application Ser. No. 13/792,259, entitled "SYSTEMS AND METHODS FOR REAL-TIME DATA COMMUNICATIONS AND MESSAGING WITH OPERATORS OF SMALL UNMANNED AIRCRAFT SYSTEMS (sUAS)," filed on Mar. 11, 2013, the disclosures of which are hereby incorporated by reference herein in its entireties.

BACKGROUND

1. Field of the Disclosed Embodiments

This disclosure relates to systems and methods for implementing substantially real-time remote multi-mission tracking and re-tasking for a plurality of locally-operated unmanned vehicles from a central location to provide mission deconfliction and mission modification in an operating environment, including an evolving and moving local operating environment, to more effectively employ the plurality of locally-operated unmanned vehicles.

2. Related Art

Deployment scenarios involving unmanned vehicles are increasing as the technology for local and remote control of those vehicles increases and government, law enforcement and other entities become aware of, and comfortable with, the capabilities and benefits of routinely employing certain unmanned vehicles for certain mission types. The term "unmanned vehicles," as that term will be used throughout this disclosure, is intended to encompass a particular class of locally, generally line-of-sight operated vehicles. Classes of those vehicles include: Unmanned Aerial Vehicles (UAVs) and the related Small Unmanned Aerial Systems (sUASs); Unmanned Ground Vehicles (UGVs); Unmanned Surface Vehicles (USVs); and Unmanned Undersea Vehicles (UUVs).

Based on an anticipated exponential growth in the employment scenarios of particularly sUAS platforms, based on their flexibility of employment and expanding capabilities, the discussion below will center around sUAS platform deployment and operations. This focus on such operations as a specific example to illustrate the benefits of the systems and methods according to this disclosure should not be construed as excluding equally applicable application to other classes of unmanned vehicles. The sUAS platforms referred to in this disclosure represent a subset of all UAVs, which are differentiated from certain other UAVs because the sUAS platforms are capable of controlled flight from launch, through in-flight operations, to recovery and/or landing in a manner similar to a conventional piloted airplane or helicopter. The control schemes for these sUAS platforms may include real-time or near-real-time control of the flight profile by an operator at a communication and control console in constant communication with a particular sUAS. The described sUAS platforms, as well as other unmanned vehicles referred to in this disclosure tend to be of limited sophistication, thereby requiring local control by an operator having line-of-sight contact with a particular sUAS platform, or other unmanned vehicle.

A focus of development efforts for a broad array of unmanned vehicles is centered on exploring operation of small, economical vehicle platforms that may be specifically fielded to a particular task to which the unmanned vehicles may be particularly adapted. A number of competing entities have evolved their operations to providing differing levels of sophistication in unmanned vehicles to support specific and evolving requirements of a broadly expanding potential customer base, including government agencies and law enforcement entities. Currently, sUAS platform capabilities are being reviewed for deployment in increasing roles in many public service and public support missions, which include, but are not limited to, border surveillance, wildlife surveys, military training, weather monitoring, fire detection and monitoring, and myriad local law enforcement surveillance support missions.

Local employment of a particular unmanned vehicle tends to be autonomous. The local operator of the unmanned vehicle, for example, may be generally unconcerned with other operations going on in the area or at other locations employing other unmanned vehicles based on close control of the locally-operated unmanned vehicles. In instances, when employing an sUAS platform, a local "pilot" of the sUAS platform may be provided certain rudimentary traffic deconfliction information, but generally is unconcerned with other operations in a vicinity, and certainly does not coordinate, in a current deployment scheme, operations with the operations of other sUAS platform operators in the area. In this regard, the immediate operation of a particular unmanned vehicle, including a particular sUAS platform, may be considered local, tactical employment of the particular unmanned vehicle. This scenario is operationally played out when one considers that the pilot of the sUAS platform is in a fixed location within line of sight to the sUAS platform operating a joystick based on observed operations of the sUAS platform, potentially augmented by an actual video feed from the sUAS platform being displayed on the operator's console to locally control mission employment of the sUAS platform.

Challenges to increasingly expanded employment of certain unmanned vehicles include (1) lack of effective oversight for deconfliction and mission reprioritization as between multiple locally-operated unmanned vehicles and (2) effective employment in operating scenarios in which a locus of the surveillance or other operations undertaken by the unmanned vehicles is not fixed, i.e., is moving in an unplanned manner across some open area terrain. An example of such a non-fixed operational scenario may involve wildfires surveillance in which a rapidly moving fire front may change direction based on the prevailing winds and/or availability of fuel to sustain the wildfire. Current employment scenarios for individual unmanned vehicles monitoring the progress of the wildfire may have difficulty responding to such movement. In scenarios in which a particular focus for surveillance (target) may be rapidly moving, those rapid movements of the target may outpace the capabilities of even a fairly sophisticated unmanned vehicle, including an sUAS platform. Such scenarios may specify a need to undertake event or occurrence monitoring with a plurality of unmanned vehicles. Such operations may optimally require overlapping coverage of the plurality of unmanned vehicles in order to keep a particular target of surveillance covered while others of the plurality of unmanned vehicles (along with their operators) may be repositioned or pre-positioned in an expected direction of movement of the target of the surveillance.

SUMMARY OF THE DISCLOSED SUBJECT MATTER

In the examples noted above, single platform surveillance scenarios will very quickly give rise to multiple platform surveillance scenarios in which efforts and movements of individual unmanned vehicles and their operators should be coordinated for effective and efficient mission accomplishment. In a typical scenario involving such coordination today operator-to-operator communication may be effected between individual unmanned vehicle operators each autonomously operating an unmanned vehicle or vehicles, when each operator may become aware of the presence of other operators in the area. The operators may attempt to establish communication with one another for first level deconfliction using local communicating radios and/or cellular telephone communication. While this may provide a level of deconfliction, it is by no means fail safe, may not promote efficient use of assets and certainly does not account for non-pre-planned movements of the assets.

As the proliferation of unmanned vehicles expands to a number of beneficial deployment scenarios, it is anticipated that multiple unmanned vehicles may be operated in a particular locus of operations to provide increasingly wide-area surveillance or other targeted and/or redundant monitoring capabilities. These unmanned vehicles can be remotely controlled/piloted, or they can be autonomous, but the systems and methods according to disclosure focus on small, locally controlled/piloted unmanned vehicles performing line-of-sight operations, e.g., local surveillance and monitoring, support of law enforcement activities, search and rescue target detection, and other beneficial missions as noted above. As such, there is developing a need for unmanned vehicle operators to coordinate their efforts with other operators, mission controllers and other agency entities, including for example air traffic controllers. The mission controllers may operate tools that allow them to maintain situational awareness of a plurality of unmanned vehicles operating in a particular area supporting a coordinated mission or multiple separate missions.

Previous work in the area of sUAS command and control has been directed to providing location and other information as feedback from local operators operating unmanned vehicles while maintaining close, i.e., line of sight, proximity to those unmanned vehicles to a remote central location to be displayed, for example, on an overall situational awareness display. Such a central location may be, for example, a government or law enforcement facility, and in the case of sUAS platforms, an air traffic control facility. At the central location, individuals may be afforded the opportunity, on a graphical display, which may include a map representation of an operating area, to monitor a number of separate unmanned vehicle operations in a particular geographic area. The unmanned vehicle operations may be directed at a same event or occurrence, or may be separately monitoring multiple unrelated events or occurrences.

The mission controller may currently have a rudimentary capacity to communicate with the unmanned vehicle operators. Even an ability to remotely monitor a graphical tracking display that provides situational awareness, the mission controller must still communicate mission parameters either by voice, or other text-like messaging systems.

It would be advantageous to expand the capacity to provide to a remote centralized location certain data regarding operating details of one or more unmanned vehicles and provide a non-voice communication scheme by which the centralized location, viewing an overall situational display of all operations in a local vicinity of a particular event or occurrence, or multiple events or occurrences, may generate and transmit to the local operators of the unmanned vehicles strategic instructions for optimizing the support provided by the employment of those unmanned vehicles at a particular time and in a particular place.

Exemplary embodiments of the systems and methods according to this disclosure may provide a mission controller, operating from a centralized location, a capability to take the graphical situational awareness a step further in actually creating, modifying, or deleting/suspending missions for one or multiple unmanned vehicles to carry out, and then to transmit the proposed mission changes to the operators for validation and execution.

Exemplary embodiments may provide a non-voice communication capability for a mission controller in a centralized location to generate and transmit new mission details in a graphical format to each of a plurality of fielded operators each controlling one or more unmanned vehicles for execution.

Exemplary embodiments may provide the unmanned vehicle operators with a capability to graphically suggest missions, and mission modifications to the mission controller for inclusion in the overall mission scheme.

Exemplary embodiments may afford the mission controller an opportunity to communicate with operating communication and control consoles associated with the plurality of unmanned vehicles via graphical inputs noting, for example, a centroid or locus of a particular event and defining sectors in or around the particular event to be individually monitored by each of a plurality of unmanned vehicles, thereby providing a capacity for complete coverage of the event or occurrence while ensuring an appropriate level of deconfliction between the individual operations of the individual unmanned vehicles is provided according to appropriate safety considerations.

Exemplary embodiments may provide the mission controller with an opportunity to display, on a communication and control console for one or more of the plurality of fielded unmanned vehicles, a graphical depiction of an operating area for each unmanned vehicle. Again here, the mission controller may "draw a box" remotely on the display of the operating communication and control console for each unmanned vehicle, or separately may specify graphically on the display a center point for the operation of the unmanned vehicle while specifying a nominal range from that center point. To streamline this last scenario, standard procedures may be employed by the mission controller such that all the mission controller need to do is to specify the center point for the operations, and to expect the local operators of each unmanned vehicles to comply with pre-specified range parameters from that center point.

Exemplary embodiments may specify, for example, other information that the mission controller may choose to provide to the local operator of the unmanned vehicle in the field including, for example, operating restrictions, specific surveillance or monitoring tasking, target description, or other like operating and safety of operation details.

Exemplary embodiments may allow the mission controller to take positive control of the missions and to, for example, "move the mission two blocks east," on the fly or in real time, when the event or occurrence dictates and/or the mission controller ascertains such a need from monitoring the situational awareness display as the event or occurrence unfolds, the mission controller taking into account some, or otherwise all, separate operations undertaken by myriad entities in a vicinity of the event or occurrence.

Exemplary embodiments may allow the local unmanned vehicle operator in the field to provide immediate feedback to the mission controller regarding the capacity of the local unmanned vehicle operator to meet the newly tasked mission by, for example, "clicking on" one or more icons associated with the new mission tasking including an icon to accept the mission or an icon to reject the mission, which may include comments back to the mission controller regarding a reason why the particular local unmanned vehicle operator is unable to comply with the new tasking.

In exemplary embodiments, in instances where the mission is accepted, the information sent directly from the mission controller to the local operator's console, may be stored as current mission data and may be separately transmitted to the unmanned vehicle for autonomous or semi-autonomous execution. In the case of an sUAS platform operation, this scenario may be akin to a pilot of a manned aircraft being forwarded "fly to" parameters over a data link from a mission control or and executing those data link commands, with automated or manual data acknowledgement and no voice communication.

In exemplary embodiments, an entire mission, area of observation, mission box, mission profile or other like indication of an operating area may be sent by the mission controller and accepted by the local unmanned vehicle operator with acceptance of the mission. Such data transfer limits any need for voice communication between the mission controller and any local unmanned vehicle operator, or between a plurality of local unmanned vehicle operators executing operations in a particular vicinity of one another including executing operations over, or around, a single occurrence or event.

In exemplary embodiments, the unmanned vehicle may be pre-programmed to accept an area, or multiple areas, of operations and to execute a specified, pre-determined search, surveillance, monitoring or operating profile within the area(s) of operations.

Exemplary embodiments may provide increased opportunity to integrate multiple unmanned vehicle missions promoting efficient use of assets, higher-quality surveillance, monitoring and/or tracking capacity, and increased vehicle-to-vehicle deconfliction in support of safer multi-vehicle operations.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods for implementing substantially real-time remote multi-mission tracking and re-tasking for a plurality of locally-operated unmanned vehicles from a central location to provide mission deconfliction and mission modification in an operating environment, including an evolving and moving local operating environment, to more effectively employ the plurality of locally operated unmanned vehicles, will be described, in detail, with reference to the following drawings, in which.

DESCRIPTION OF THE DISCLOSED EMBODIMENTS

Figure 1:
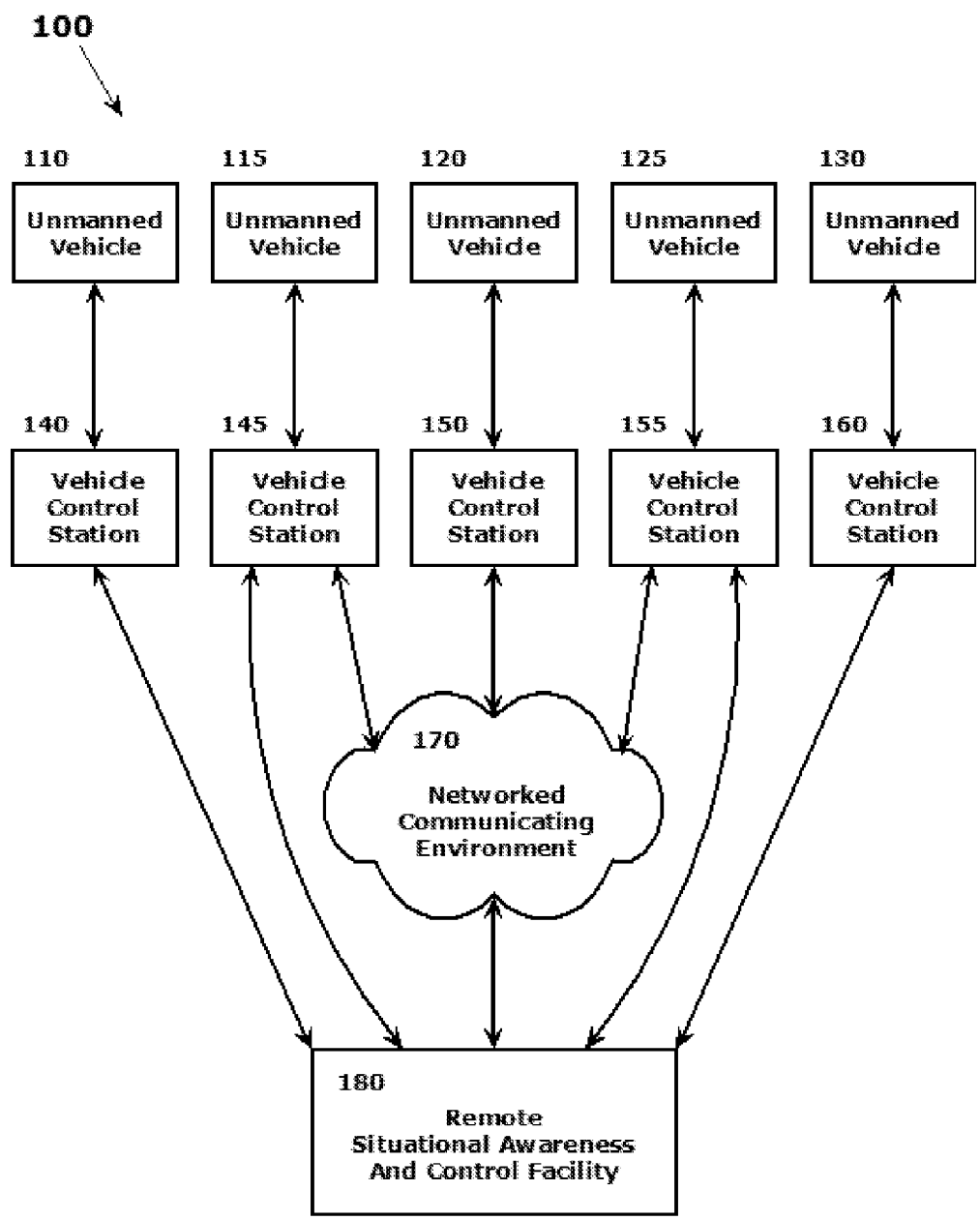
FIG. 1 illustrates an exemplary embodiment of an operating environment with a communication and control network in which the unmanned vehicle mission planning, coordination and collaboration schemes according to this disclosure may be implemented.

The disclosed systems and methods for implementing substantially real-time remote multi-mission tracking and re-tasking for a plurality of locally-operated unmanned vehicles from a central location by which a mission controller may create, modify, delete, and transmit one, or multiple missions to be executed by remote unmanned vehicle pilot/operator teams in a graphical manner. to provide mission deconfliction and mission modification in an operating environment, including an evolving and moving local operating environment, to more effectively employ the plurality of locally operated unmanned vehicles will generally refer to these specific utilities for those systems and methods. Exemplary embodiments described and depicted in this disclosure should not be interpreted as being specifically limited to any particular configuration of an unmanned vehicle, including any particular small unmanned aircraft or aerial platform system (sUAS platform), or to any particular cooperating communication and control console by which a vehicle operator, generally in line-of-sight proximity and communication with the unmanned vehicle, provides command, control and communication (C3) services with respect to operation of the unmanned vehicle. Any advantageous use of an interactive communication and control scheme for integrating real-time, or near-real-time, information regarding a position and operations of one or more unmanned vehicles to provide situational awareness regarding other activities in a vicinity of the one or more unmanned vehicles, and the capacity for an overall mission controller to provide unmanned vehicle mission planning, coordination and collaboration with a plurality of unmanned vehicles to enhance operations of the plurality of unmanned vehicles and to provide a streamlined graphically-based communication mechanism directly to the unmanned vehicle operators regarding mission tasking and/or re-tasking in a manner that may enhance deconfliction and safety of operations for all involved unmanned vehicles by reducing potential conflicts in an area surrounding a particular event or occurrence is contemplated as being covered by this disclosure.

The systems and methods according to this disclosure will be described as being particularly adaptable to employment scenarios for, and configurations of, sUAS platforms in which the aerial vehicles are flown by an operator with a cooperating communication and control console, the operator having visual contact with the platform for substantially all of an event duration. These references are meant to be illustrative only in providing a single real-world utility for the disclosed systems and methods, and should not be considered as limiting the disclosed systems and methods in any way.

Additional features and advantages of the disclosed embodiments will be set forth in the description that follows, and in part will be obvious from the description, or may be learned by practice of the disclosed embodiments. The features and advantages of the disclosed embodiments may be realized and obtained by means of the instruments and combinations particularly pointed out in the appended claims.

Various embodiments of the disclosed systems and methods are discussed in detail below. While specific implementations are discussed, it should be understood that this is done for illustration purposes only. A person skilled in the relevant art will recognize that other components and configurations may be used without departing from the spirit and scope of the disclosed embodiments.

The disclosed schemes may provide a mission controller, generally operating remotely from any individual unmanned vehicle operation, and in contact with an overall situational awareness display that displays at least operating information and a real-time mission profile for one or more unmanned vehicles in a graphical format, with capabilities to:

View one or multiple missions from all associated unmanned vehicles on a graphical situational awareness display;

Create, modify, or delete/suspend missions for any, or all, of the associated unmanned vehicles;

Create, save, and retrieve unmanned vehicle missions for later use;

Send newly created, modified, or deleted/suspended missions to operators of the unmanned vehicles for graphical display on respective communicating and control consoles for those unmanned vehicles for execution (the graphical display capability removing any requirement for the unmanned vehicle operators in the field to interpret, for example, text-commanded or voice-commanded information for mission tasking that may be directed by the mission controller);

Receive responsive information from the unmanned vehicle operators validating receipt of the newly created, modified or deleted/suspended missions, including acceptance of the newly created or modified missions, or rejection of the newly-created or modified missions (including a reason for the rejection, e.g., a reason why the unmanned vehicle operator may not be able to execute the newly-created or modified mission as commanded).

Receive suggested missions, mission modifications, or deletions/suspensions from unmanned vehicle operators (via non-voice communication) for incorporation into the overall operation.

The disclosed schemes may provide a local unmanned vehicle operator, generally operating in-line-of-sight proximity and communication with one or more unmanned vehicles in a specified area of operations, and in communication with a remote mission controller that is in contact with an overall situational awareness display that displays at least operating information and an operating profile regarding one or more unmanned vehicles in a graphical format, with capabilities to:

Accept, or reject missions, mission modifications, or deletions/suspensions that are presented in a graphical format on the communication and control console of the unmanned vehicle operator from the remote mission controller;

Suggest missions, mission modifications, or deletions/suspensions by simply circling an area on a graphical display field on a display component of the communication and control console and submitting the proposed circled area in a graphical format to the remote mission controller as a suggested mission.

Received from the remote mission controller a graphical indication that the suggestion has been validated, determined to fit into the overall operational scheme; confirmed to not conflict with other unmanned vehicle operations in a vicinity, and/or approved (or denied).

The disclosed schemes are specifically directed to a mission controller using a system for the graphical tracking and communicating with one, or multiple, unmanned vehicle operators to plot a new mission using touch screen technology, or by clicking on a map using a computer mouse or other pointing device. The new mission would generally consist of waypoints to be followed in a particular order, a series of individual waypoints that may be connected to specify an operating area, a single waypoint specifying a centroid of a circle, or polygon, of a specified or predetermined shape and/or size to suggest that the unmanned vehicle may be tasked to operate within to conduct, for example, surveillance, monitoring, search or tracking operations. The mission controller may submit the suggested mission to a particular unmanned vehicle operator by clicking on a current position or operating profile for the unmanned vehicle on an interactive graphical situational awareness display and potentially choosing a context-sensitive menu item by right-clicking a mouse, or by executing another touch method. The mission controller may receive graphical or other feedback that the particular unmanned vehicle operator received the mission. The mission controller may receive further feedback if the mission was accepted, or rejected by the particular unmanned vehicle operator to identify any relevant issues in the re-tasked mission.

In the case of an existing mission, the mission controller may be able to graphically modify or delete/suspend the mission parameters by specific interaction with the interactive situational awareness display in a known manner, such as those mentioned above, and submit the modification, or deletion/suspension to the particular unmanned vehicle operator for acceptance or rejection.

The mission controller may also be able to create missions as described above and to save the created missions for later use. Saved missions could also be retrieved, modified, and deleted from the database by the mission controller.

From the particular unmanned vehicle operator perspective, the particular unmanned vehicle operator, potentially having more local situational awareness, would be able to suggest new missions, mission modifications, or deletions/suspensions by graphically plotting waypoints, or drawing circles or polygons, on the display component of the communication and control console by which the particular unmanned vehicle operator communicates with and controls the unmanned vehicle. The unmanned vehicle operator suggestions may be sent to the mission controller for approval or rejection. The unmanned vehicle operator may also receive feedback on mission receipt, as well as acceptance or rejection by the mission controller.

All communication between the mission controller and one or more unmanned vehicle operators may consist of a set of specialized Web Service communications using, for example, HTTP/HTTPS over TCP/IP. The communication network over which commands may be transmitted from a centralized facility housing the mission controller to the communication and control consoles of one or more unmanned vehicle operators may consist of the open Internet communications, or private network communication. It is generally envisioned that the unmanned vehicle operators may choose to communicate using mobile 3G/4G/LTE devices, either attached to the communication and control consoles, or supplied as mobile routers having Wi-Fi, WiGig, or other communication protocols from the communication and control consoles to a mobile carrier backhaul. The Web Services mentioned above may be hosted on one or more secure server(s) on a public or private network reachable by both the mission controller and the unmanned vehicle operators.

FIG. 1 illustrates an exemplary embodiment of an operating environment 100 with a communication and control network in which the unmanned vehicle mission planning, coordination and collaboration schemes according to this disclosure may be implemented. As shown in FIG. 1, the exemplary operating environment 100 may include a plurality of unmanned vehicles 110-130, respectively locally operated by a plurality of vehicle control stations 140-160. Each of the plurality of vehicle control stations 140-160 may comprise a communication and control console by which the respective unmanned vehicles 110-130 may be communicated with, and controlled locally by, an unmanned vehicle operator at the vehicle control station 140-160. Each of the unmanned vehicles 110-130 may communicate with at least one of the plurality of vehicle control stations 140-160 to provide information on geo-location of the unmanned vehicle, and/or sensor and surveillance data and operating parameter information regarding operation of the unmanned vehicles 110-130. Generally, there will be a one-to-one correspondence between the unmanned vehicles 110-130 and the vehicle control stations 140-160, in the manner shown in FIG. 1. This does not, however, preclude multiple ones of the unmanned vehicles 110-130 being in communication with, and/or controlled by, a single one of the vehicle control stations 140-160.

Each of the vehicle control stations 140-160 may preferably be operated by an unmanned vehicle operator that maintains line of sight visual communication with the unmanned vehicles 110-130 during operations. Currently for example, commercial operations of sUAS platforms are limited by the Federal Aviation Administration (FAA) regulations to operations (1) outside of controlled airspace, (2) in line of sight to the operator, (3) during daylight hours, (4) below 400 feet above ground level (AGL), and (5) as specifically authorized by an FAA (Certificate Of Authorization—COA).

One or more of the vehicle control stations 140-160 may be in the form of a dedicated special-purpose communication and control console, such as, for example, a tactical operating station connected to a conventional radio transmitter, which is designed and specifically configured to communicate with, and otherwise control, one or more of the unmanned vehicles 110-130. Otherwise, one or more of the vehicle control stations 140-160 may be in a configuration of a laptop, tablet or other portable computing device on which is hosted one or more vehicle communication and vehicle control applications. The vehicle control stations 140-160, regardless of configuration, may enable a radio, or other wireless communication, link for implementing two-way data communication between the unmanned vehicles 110-130 and the respective vehicle control stations 140-160.

The unmanned vehicles 110-130 may be configured with a payload that typically includes a vehicle control station communications link enabling line-of-sight wireless communication between the unmanned vehicles 110-130 and the respective corresponding vehicle control station 140-160. The unmanned vehicles 110-130 may also typically carry various lightweight sensor packages, such as, for example, cameras and environmental sensors. The unmanned vehicles 110-130 may pass sensor information and positioning information to the respective corresponding vehicle control stations 140-160. In embodiments, positioning information for the unmanned vehicles 110-130 may be provided by way of a miniature global positioning satellite (GPS) system receiver mounted on the unmanned vehicles 110-130.

The exemplary operating environment 100 may include an extended communication and control network in which remote monitoring for mission tracking and mission data acquisition, real-time data communication and messaging, and graphical mission display may be implemented for unmanned vehicle mission planning, coordination and collaboration. The extended communication and control network may specifically account for idiosyncrasies of locally-controlled unmanned vehicles, and burying operating parameters of the locally-controlled unmanned vehicles. Each of the plurality of vehicle control stations 140-160 may communicate with a remote situational awareness and control facility 180 either directly or via one or more public or private network communication environments 170, or in some combination of direct and supported communications as is to be reasonably inferred from the differently-depicted lines of communication between the vehicle control stations 140-160 and the remote situational awareness and control facility 180 shown in FIG. 1. The remote situational awareness and control facility 180 may house the mission controller, the situational awareness display, and computing and communication components by which the mission controller may create, modify and/or delete/suspend missions and communicate the newly created missions, modified missions and/or deleted/suspended missions to the individual vehicle control stations 140-160 in the manner described above.

Figure 2:
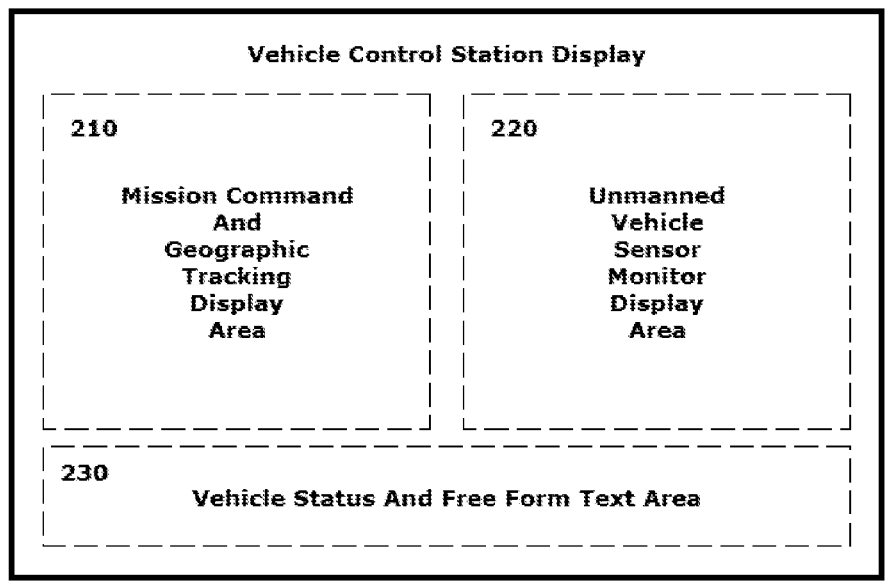
FIG. 2 illustrates an exemplary embodiment of a display component for a communication and control console with which a local operator controls operation of an unmanned vehicle and communicates with a mission coordination facility for unmanned vehicle mission planning, coordination and collaboration according to this disclosure.

FIG. 2 illustrates an exemplary embodiment of a display component 200 for a communication and control console with which a local unmanned vehicle operator controls operation of an unmanned vehicle and communicates pertinent information with a mission coordination facility for unmanned vehicle mission planning, coordination and collaboration according to this disclosure. As shown in FIG. 2, the exemplary display component may be sectioned into individual display fields. A first display field may comprise a mission command and geographic tracking display area 210 by which, although in line of sight communication with the unmanned vehicle, the unmanned vehicle operator may gain additional tracking information and track resulting movements of the unmanned vehicle based on control inputs over, for example, a background map display of a local operating area in which, or over which, the unmanned vehicle is being operated. A second display field may comprise an unmanned vehicle sensor monitor display area 220 by which the unmanned vehicle operator may monitor data communicated to the communication and control console from one or more of the sensors, including cameras, mounted on the unmanned vehicle with which the communication and control console is in contact. A third display field may comprise a vehicle status and/or free-form text area 230 by which the unmanned vehicle operator may monitor vehicle operating parameters and may exchange information with other entities in communication with the unmanned vehicle operator via the communication and control console in, for example, an instant messaging, email, or text/SMS message exchange format. While depicted in FIG. 2 as being three discrete display fields, this depiction should not be considered to preclude that one or more of the depicted discrete display fields may be combined with the others of the depicted discrete display fields in an interleaved, or overlaid, composite display.

Figure 3:
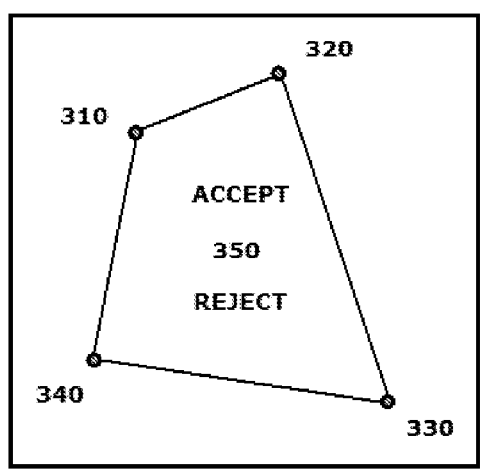
FIG. 3 illustrates a first exemplary embodiment of a commanded graphical display that may be transmitted to the communication and control console for an unmanned vehicle from a remote mission controller according to the disclosed schemes.

FIG. 3 illustrates a first exemplary embodiment of a commanded graphical display 300 that may be transmitted to the communication and control console for an unmanned vehicle from a remote mission controller according to the disclosed schemes. As shown in FIG. 3, the commanded graphical display 300 may comprise a series, sequence or set of geographic points 310-340 that may be connected to define an area of operations specified by the remote mission controller for newly-created or modified operation of the unmanned vehicle. Textual or icon prompts (e.g., ACCEPT/REJECT) 350 may be automatically displayed on command from the remote mission controller, or as part of the graphical data package, sent from the remote mission controller in order that the local unmanned vehicle operator at the communication and control console may signify acceptance or rejection of the newly-created or modified operation for the unmanned vehicle. Any prompt that provides information requested by the remote mission controller may be facilitated. Additionally, the unmanned vehicle operator may use free-form instant messaging, email or text/SMS messaging to specify, in the case of a rejected mission, reasons for the rejection that remote mission controller may then factor into a decision-making process for reassignment or re-tasking of other unmanned vehicles in the area. Although shown as a single area of operation for the single unmanned vehicle under the control of the unmanned vehicle operator of one communication and control console, in order to provide situational awareness for the unmanned vehicle operator of each communication and control console, other displays may be provided showing operating areas for other unmanned vehicles being cooperatively operated in a vicinity of the single unmanned vehicle.

Figure 4:
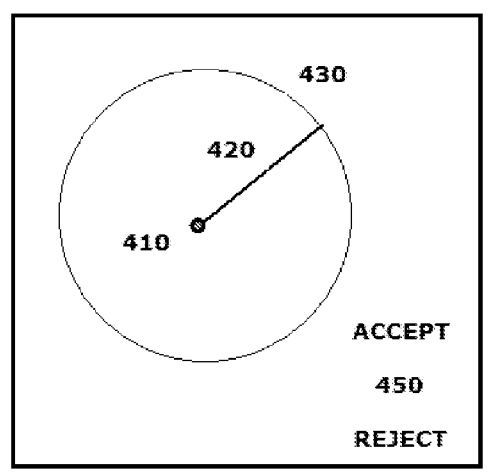
FIG. 4 illustrates a second exemplary embodiment of a commanded graphical display that may be transmitted to the communication and control console for an unmanned vehicle from a remote mission controller according to the disclosed schemes.

FIG. 4 illustrates a second exemplary embodiment of a commanded graphical display that may be transmitted to the communication and control console for an unmanned vehicle from a remote mission controller according to the disclosed schemes. As shown in FIG. 4, the commanded graphical display 400 may comprise a single center point 410 as a centroid for an area of operations specified by the remote mission controller for newly-created or modified operation of the unmanned vehicle. A particular radius 420 from that single center point 410 may be specified by the remote mission controller and translated by the receiving communication and control console to display an essentially circular area of operations of the specified radius 420 about the single center point 410. Otherwise, in embodiments, the communication and control console may apply known parameters, e.g., a radius of operations for the unmanned vehicle that is pre-determined, pre-specified, or according to some operating rule for the unmanned vehicle. Again here, textual or icon prompts (e.g., ACCEPT/REJECT) 450 may be automatically displayed on command from the remote mission controller, or as part of the graphical data packages sent from the remote mission controller, in order that the local unmanned vehicle operator at the communication and control console for the unmanned vehicle may signify acceptance or rejection of the newly-created or modified operation for the unmanned vehicle. As above, any prompt that provides information requested by the remote mission controller may be facilitated. Additionally, the unmanned vehicle operator may use free-form instant messaging, email or text/SMS messaging to specify, in the case of a rejected mission, reasons for the rejection that remote mission controller may then factor into a decision-making process for reassignment of other unmanned vehicles in the area. Although shown as a single area of operation for the single unmanned vehicle under the control of the operator of one communication and control console, in order to provide situational awareness for the operator of each communication and control console, other displays may be provided showing operating areas for other unmanned vehicles being cooperatively operated in a vicinity of the single unmanned vehicle.

Other configurations of graphical display command may be forwarded by the remote mission controller to the communication and control console of one or more of the locally operated unmanned vehicles. These may include, but are not limited to, a series of sequential geographic waypoints defining a particular route for the unmanned vehicle to follow in a specified direction. No limitation is intended to be implied by the depictions in FIGS. 3 and 4 and the accompanying description. It is anticipated that virtually any graphically-definable area of operations or route of progress for an unmanned vehicle may be drawn by the remote mission controller and sent to a graphical display on a communication and control console for an unmanned vehicle.

Figure 5:
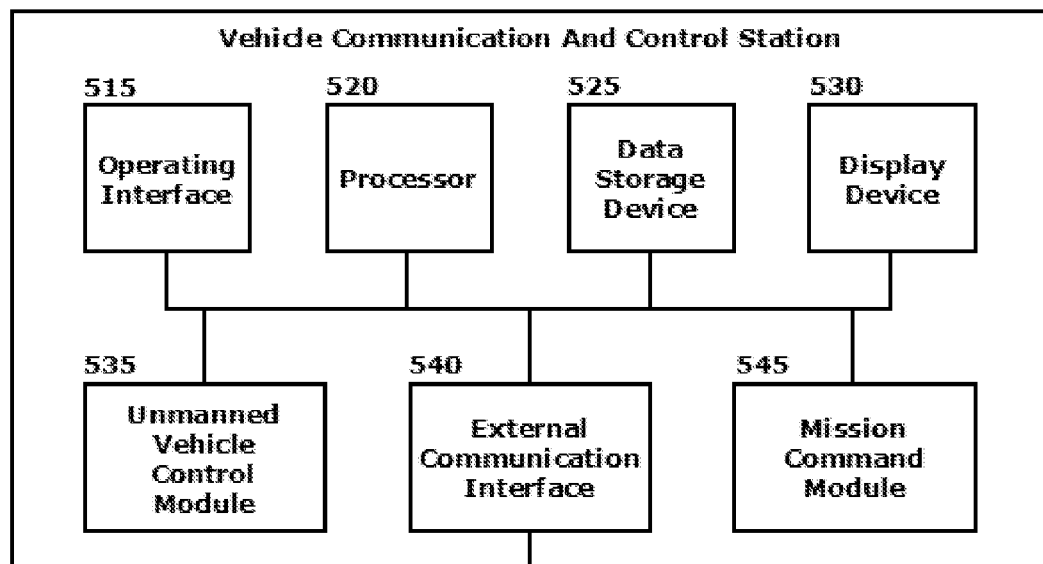
FIG. 5 illustrates an exemplary embodiment of a collaborative system for communication between an unmanned vehicle communication and control station and a remote situational awareness and control (mission coordination/control) facility to implement unmanned vehicle mission planning, coordination and collaboration schemes according to this disclosure.
Figure 5:
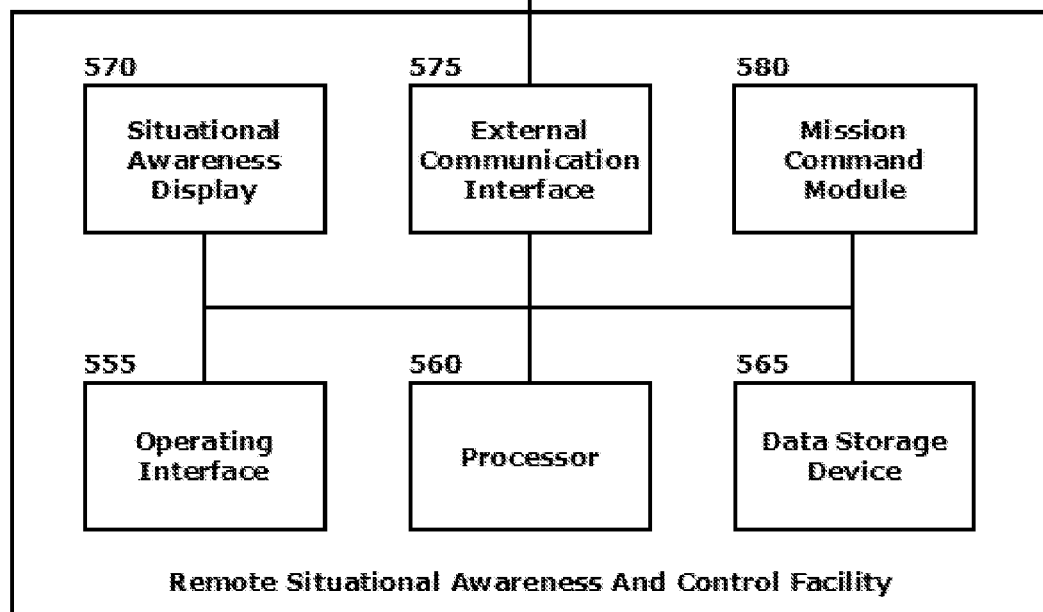

FIG. 5 illustrates an exemplary embodiment of a collaborative system 500 for communication between a vehicle communication and control station 510 and a remote situational awareness and control (mission coordination/control) facility 550 to implement unmanned vehicle mission planning, coordination and collaboration schemes according to this disclosure.

The vehicle communication and control station 510 may include an operating interface 515 by which a local unmanned vehicle operator may enter information to (1) communicate with, and control, the unmanned vehicle, and/or (2) communicate with the remote mission controller in the remote situational awareness and control facility 550. The operating interface 515 may be a part, or a function, of a graphical user interface (GUI) mounted on, integral to, or associated with, the vehicle communication and control station 510. The operating interface 515 may alternatively take the form of any commonly known user-interactive device by which a user input and/or command are input to an automated processing system including, but not limited to, a keyboard or a touchscreen, a mouse or other pointing device, a microphone for providing verbal commands, or any other commonly-known operating interface device.

The vehicle communication and control station 510 may include one or more local processors 520 for carrying out the individual operations and functions of the vehicle communication and control station 510. The processor 520 may reference, for example, each input from the remote mission controller to facilitate operations of one or more unmanned vehicles with which the vehicle communication and control station 510 may be associated and in communication.

The vehicle communication and control station 510 may include one or more data storage devices 525. Such data storage device(s) 525 may be used to store data or operating programs to be used by the vehicle communication and control station 510, and specifically the processor(s) 520 in carrying into effect the disclosed operations and functions. Data storage device(s) 525 may be used to store information regarding received newly-created missions, modified missions and deleted or suspended missions such that the processor 520 in the vehicle communication and control station 510 may act on the received information, displaying the graphical information defining the mission on a display device of the vehicle communication and control station 510.

The data storage device(s) 525 may include a random access memory (RAM) or another type of dynamic storage device that is capable of storing updatable database information, and for separately storing instructions for execution of system operations by, for example, processor(s) 520. Data storage device(s) 525 may also include a read-only memory (ROM), which may include a conventional ROM device or another type of static storage device that stores static information and instructions for processor(s) 520. Further, the data storage device(s) 525 may be integral to the vehicle communication and control station 510, or may be provided external to, and in wired or wireless communication with, the vehicle communication and control station 510, including as cloud-based storage and/or processing elements.

The vehicle communication and control station 510 may include at least one display device 530, which may be configured as one or more conventional mechanisms that output information to a user, including, but not limited to, a display screen on a GUI associated with the vehicle communication and control station 510 to provide a graphical depiction of an operating area, or a route of progress, for operation of the one or more unmanned vehicles associated with, and controlled by, the vehicle communication and control station 510. The display device 530 may display information according to the descriptions of FIGS. 2-4 above, and other like information, sent to the vehicle communication and control station 510 by the remote mission controller.

The vehicle communication and control station 510 may include an unmanned vehicle control module 535. The unmanned vehicle control module 535 may be a function of the processor 520 in communication with the data storage device 525, or may be a stand-alone device or unit within the vehicle communication and control station 510. When a stand-alone device or unit within the vehicle communication and control station 510, the unmanned vehicle control module 535 may itself reference information from other components, including but not limited to the operating interface 515 to facilitate manual, semi-automated or automated control of the one or more unmanned vehicles associated with, and controlled by, the vehicle communication and control station 510.

The vehicle communication and control station 510 may include at least one external communication interface 540 by which the vehicle communication and control station 510 may communicate with (1) the one or more unmanned vehicles associated with, and controlled by, the vehicle communication and control station 510, and (2) the remote situational awareness and control facility 550.

The vehicle communication and control station 510 may include a mission command module 545. The mission command module 545 may be a function of the processor 520 in communication with the data storage device 525, or may be a stand-alone device or unit within the vehicle communication and control station 510. When a stand-alone device or unit within the vehicle communication and control station 510, the mission command module 545, may receive via the external communication interface 540, mission command information from the remote mission controller in the remote situational awareness and control facility 550 and implement displaying of the mission command information, implement displaying of the unmanned vehicle operator choices for acceptance or rejection of the mission command information, and, in a semi-automated or automated mode, translate the mission command information to the one or more unmanned vehicles associated with, and controlled by the vehicle communication and control station 510 to be carried out by the one or more unmanned vehicles.

The remote situational awareness and control facility 550 may include its own operating interface 555 by which the remote mission controller may communicate with other components in the remote situational awareness and control facility 550 and, via an external communication interface 575, may communicate with the vehicle communication and control station(s) 510 controlling one or more unmanned vehicles for directing mission planning, generation, coordination and collaboration with the vehicle communication and control station(s) 510. This operating interface 555 may be in any of the configurations described above with respect to the operating interface 515 in the vehicle communication and control station 510.

The remote situational awareness and control facility 550 may include one or more local processors 560 for carrying out the individual operations and functions of the remote situational awareness and control facility 550. The processor 560 may reference, for example, each input from the mission controller via the operating interface 555 to facilitate operations of the one or more unmanned vehicles via the vehicle communication and control station 510 associated, and in communication, with the one or more unmanned vehicles.

The remote situational awareness and control facility 550 may include one or more data storage devices 565. Such data storage device(s) 565 may be used to store data or operating programs to be used by the remote situational awareness and control facility 550, and specifically the processor(s) 560 in carrying into effect the disclosed operations and functions. Data storage device(s) 565 may be used to store information regarding newly-created missions, modified missions and deleted or suspended missions such that the processor 560 in the remote situational awareness and control facility 550 may generate the graphical information to be transmitted to, and displayed on, the display device 530 of the vehicle communication control station 510. The data storage device(s) 565 may individually be configured as described above with respect to data storage device(s) 525 in the vehicle communication and control station(s) 510.

The remote situational awareness and control facility 550 may include at least one situational awareness display 570, which may be configured as one or more conventional mechanisms that visually output information to a user such as, for example, a remote mission controller. The at least one situational awareness display 570 may display an overall situational awareness picture with at least operating information regarding one or more unmanned vehicles in a graphical format with capabilities for the mission controller to view one or multiple missions from all associated unmanned vehicles as a single graphical situational awareness display. Based on the information presented to the mission controller on the at least one situational awareness display 570, the mission controller may make relevant determinations regarding optimal placement of operating unmanned vehicle assets in the manner discussed generally above.

The remote situational awareness and control facility 550 may include at least one external communication interface 575 by which the remote situational awareness and control facility 550 may communicate with the vehicle communication and control station 510 to forward generated mission command information and to receive from the vehicle communication and control station 510 unmanned vehicle operator acknowledgment, acceptance, rejection or comments of the generated mission command information.

The remote situational awareness and control facility 550 may include a mission command module 580. The mission command module 580 of the remote situational awareness and control facility 550 may allow the mission controller to take actions based on an evaluation of the situational awareness display, to (1) define appropriate overlapping coverage for surveillance efforts being undertaken, for example, by a plurality of unmanned vehicles, (2) account for a loss of one or more of a plurality of unmanned vehicles monitoring a particular event or occurrence due to mechanical or other failure of the unmanned vehicle or control system in the field, (3) provide appropriate lead time for an operator in the field to reposition the unmanned vehicle and its operator along a path of a particular moving event or occurrence in time to take up a field of coverage as a moving event or occurrence exits the field of coverage of another unmanned vehicle, and (4) execute other actions as may be appropriate to create, modify or delete/suspend missions based on the information provided. The mission command module 580 may be a function of the processor 560 in communication with the data storage device 565, or may be a stand-alone device or unit within the remote situational awareness and control facility 550.

All of the various components of the exemplary system 500, as depicted in FIG. 5, may be connected internally within the vehicle communication and control station 510 and separately within the remote situational awareness and control facility 550, and to each other, via combinations of wired and wireless communication pathways to facilitate data, messaging and control exchange between the various components of the disclosed system.

It should be appreciated that, although depicted in FIG. 5 as a series of separate discrete units with specific operating functionalities, the various disclosed elements of the exemplary system 500 may be arranged in any combination of sub-systems as individual components or combinations of components. In other words, no specific configuration is to be implied by the depiction in FIG. 5. Further, although depicted as individual units for ease of understanding of the details provided in this disclosure regarding the exemplary system 500 components, it should be understood that the described functions of any of the individually-depicted components may be undertaken, for example, by one or more processors within, connected to, and/or in communication with the separate system components of the vehicle communication and control station 510 and the remote situational awareness and control facility 550.

Figure 6:
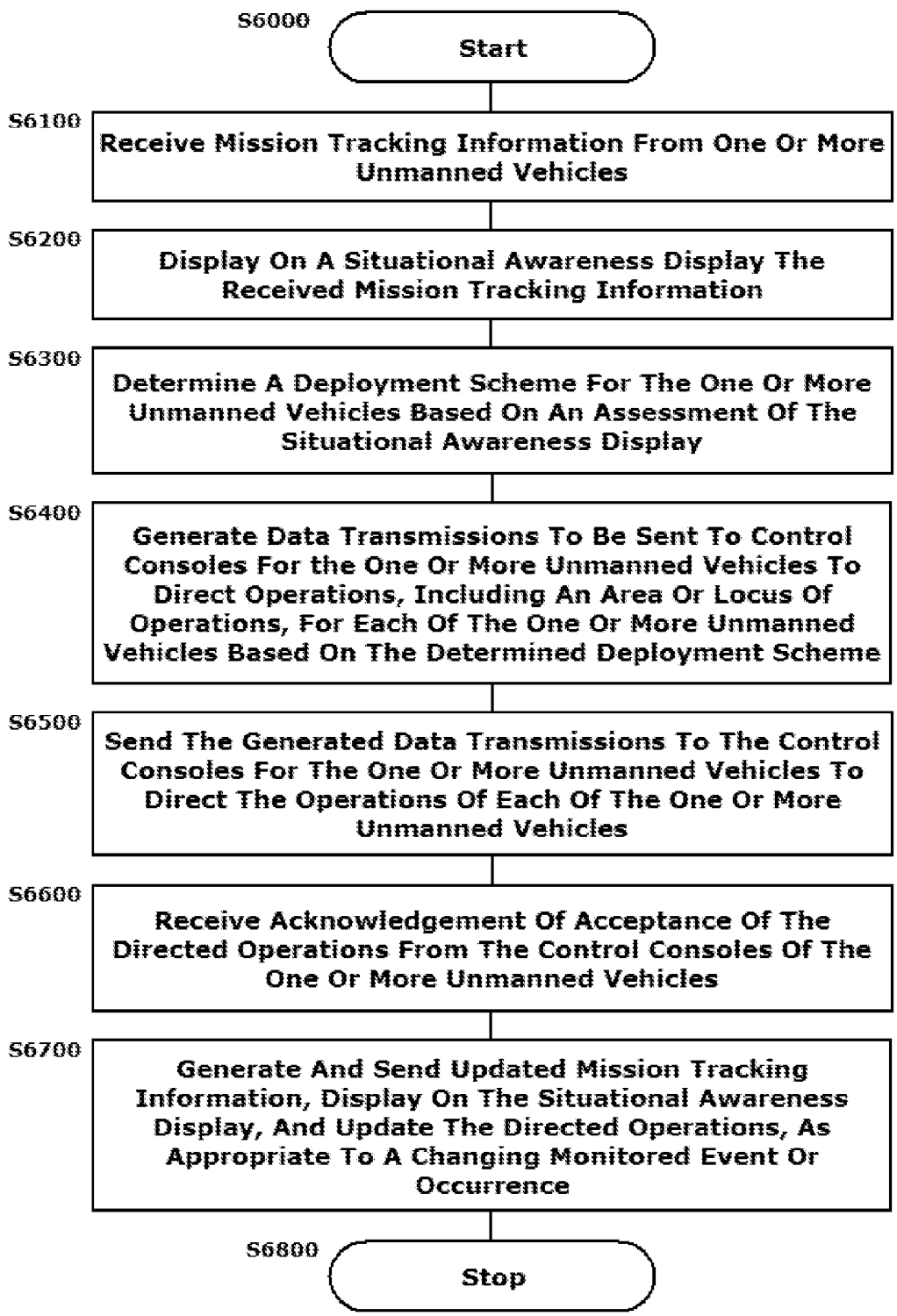
FIG. 6 illustrates a flowchart of an exemplary method for implementing an unmanned vehicle mission planning, coordination and collaboration scheme according to this disclosure.

The disclosed embodiments may include an exemplary method for implementing an unmanned vehicle mission planning, coordination and collaboration scheme. FIG. 6 illustrates and exemplary flowchart of such a method. As shown in FIG. 6, operation of the method commences at Step S6000 and proceeds to Step S6100.

In Step S6100, mission tracking information from one or more unmanned vehicles may be received at a central location. Operation of the method proceeds to Step S6200.

In Step S6200, the received mission tracking information from the one or more unmanned vehicles may be graphically displayed on a consolidated situational awareness display. Operation of the method proceeds to Step S6300.

In Step S6300, a deployment scheme, including an operationally optimal, effective, and/or efficient deployment scheme may be determined for the one or more unmanned vehicles based on an assessment of the situational awareness display. The assessment may be made by an individual user, i.e., a mission controller, or by an automated unmanned vehicle mission control evaluation scheme for evaluating information presented on the situational awareness display. Operation of the method proceeds to Step S6400.

In Step S6400, transmissions may be generated to be sent to communication and control consoles for the one or more unmanned vehicles with which the central location may be in communication to direct operations of those unmanned vehicles, including specifying areas, or loci, of operations for each one of the unmanned vehicles based on the determined deployment scheme. Operation of the method proceeds to Step S6500

In Step S6500, the generated data transmissions may be sent to the communication and control consoles for the one or more unmanned vehicles to direct operations of each of the one or more unmanned vehicles according to the optimal, efficient, or effective operation of the scheme determined by the central location. The generated data transmissions include graphical display elements for displaying the specified areas, or loci, of operations for each of the unmanned vehicles, thereby requiring no interpretive assessment by the unmanned vehicle operators reviewing the information provided on their communication and control consoles. Operation of the method proceeds to Step S6600.

In Step S6600, acknowledgment and acceptance (or rejection) of the directed operations may be received at the central location from the communication and control consoles of the one or more unmanned vehicles based on a local operator of the unmanned vehicles evaluating, for example, an ability to comply with the directed operations. Operation of the method proceeds to Step S6700.

In Step S6700, based on observed, or indicated, changes in the overall progress of a particular event or occurrence under observation, and other information received from the one or more unmanned vehicle operators, updated mission tracking information may be generated and sent to the individual communication and control consoles of the one or more unmanned vehicles to update the directed operations and, as appropriate, to change specified missions for the one or more unmanned vehicles. Operation of the method proceeds to Step S6800, where operation of the method ceases.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable operating environments in which the subject matter of this disclosure may be implemented for familiarity and ease of understanding. Although not required, embodiments of the disclosed systems, and implementations of the disclosed methods, may be provided, at least in part, in a form of hardware circuits, firmware, or software computer-executable instructions to carry out the specific functions described. The hardware circuits, firmware, or software-executable instructions may include individual program modules executed by the one or more processors. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in integrating operations of multiple unmanned vehicles using many and widely varied system components.

As indicated above, embodiments within the scope of this disclosure may also include computer-readable media having stored computer-executable instructions or data structures that may be accessed, read and executed by one or more processors in differing devices, as described. Such computer-readable media can be any available media that can be accessed by a processor, general purpose or special purpose computer. By way of example, and not limitation, such computer-readable media may comprise RAM, ROM, EEPROM, CD-ROM, flash drives, data memory cards or other analog or digital data storage devices that may be used to carry or store desired program elements or steps in the form of accessible computer-executable instructions or data structures. When information is transferred or provided over a network or another communication connection, whether wired, wireless, or in some combination of the two, the receiving processor may properly view the connection as a computer-readable medium. Thus, any such connection is properly termed a computer-readable medium. Combinations of the above should also be included within the scope of the computer-readable media for the purposes of this disclosure.

Computer-executable instructions may include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions, or associated data structures, represents one example of a corresponding sequence of acts for implementing the functions described in the steps of the above-outlined exemplary method. The exemplary depicted steps may be executed in any reasonable order to effect the objectives of the disclosed embodiments. No particular order to the disclosed steps of the method is necessarily implied by the depiction in FIG. 6, except where execution of a particular method step is a necessary precondition to execution of any other method step.

Although the above description may contain specific details, they should not be construed as limiting the claims in any way. Other configurations of the described embodiments of the disclosed systems and methods are part of the scope of this disclosure. It will be appreciated that various of the above-disclosed and other features and functions, or alternatives thereof, may be desirably combined into many other different systems or applications. Although the above description may contain specific details, they should not be construed as limiting the claims in any way. Other configurations are part of the scope of the disclosed embodiments. For example, the principles of the disclosed embodiments may be applied to each individual user, unmanned vehicle operator, mission controller and/or other interested party, where each user may individually employ components of the disclosed systems and methods to their advantage. This enables each user to enjoy the benefits of the disclosed embodiments even if any one of the large number of possible applications do not need some portion of the described functionality. In other words, there may be multiple instances of the disclosed systems each processing the content in various possible ways. It does not necessarily need to be one system used by all end users. Accordingly, the appended claims, and their legal equivalents, should only define the disclosed embodiments, rather than any specific example given.

We claim:

1. A system for communicating regarding unmanned vehicle operations, comprising:
    a mission information device at a facility located remotely from unmanned vehicle operations, the mission information device being configured to receive mission planning and tracking information regarding unmanned vehicle operations directly from one or more local communication and control consoles, each controlling operations of one or more unmanned vehicles;
    a situational awareness display at the facility configured to graphically depict mission planning and tracking information for the one or more unmanned vehicles;
    an operating input device configured to receive user inputs of a graphical depiction on the situational awareness display of an unmanned vehicle mission profile for one or more unmanned vehicles to provide separation from operations of other vehicles in a vicinity of each of the one or more unmanned vehicles, the operating input device being configured as a user interactive input device by which a user at the facility draws the graphical depiction of the unmanned vehicle mission profile on the situational awareness display; and
    a mission command device that is programmed to
        interpret the input graphical depiction of the unmanned vehicle mission profile,
        generate a data transmission commanding at least one of a new or modified mission for at least one of the one or more unmanned vehicles based on the input graphical depiction, and
        transmit the data transmission based on the input graphical depiction to at least one of the one or more local communication and control consoles for display as a presented graphical depiction,
    the graphical depiction of the unmanned vehicle mission profile being a series of points defining a closed area within which a particular unmanned vehicle is commanded to operate exclusively separated from the other vehicles.

2. The system of claim 1, wherein the situational awareness display at the facility is configured to graphically depict the received mission planning and tracking information for the one or more unmanned vehicles as an overlay over a map of an area surrounding operations of the one or more unmanned vehicles.

3. The system of claim 1, wherein the mission command device is configured to send additional textual information with the data transmission to specify additional instructions to an operator of the at least one of the one or more local communication and control consoles.

4. The system of claim 1, wherein the mission information device is further configured to receive from a local operator of the at least one of the one or more local communication and control consoles input of a graphical mission profile transmitted to the facility and displayed on the situational awareness display in the facility.

5. The system of claim 1, wherein the mission command device is further configured to receive an acknowledgement of receipt of the data transmission from the at least one of the one or more local communication and control consoles.

6. The system of claim 5, wherein the acknowledgement includes information from a local operator of the at least one of the one or more local communication and control consoles accepting or rejecting the commanded at least one of the new or modified mission.

7. A system for communicating regarding unmanned vehicle operations, comprising:
   a mission information device at a facility located remotely from unmanned vehicle operations, the mission information device being configured to receive mission planning and tracking information regarding unmanned vehicle operations directly from one or more local communication and control consoles, each controlling operations of one or more unmanned vehicles;
   a situational awareness display at the facility configured to graphically depict mission planning and tracking information for the one or more unmanned vehicles;
   an operating input device configured to receive inputs of a graphical depiction on the situational awareness display of an unmanned vehicle mission profile for one or more unmanned vehicles to provide separation from operations of other vehicles in a vicinity of each of the one or more unmanned vehicles, the operating input device being configured as a user interactive input device by which a user at the facility draws the graphical depiction of the unmanned vehicle mission profile on the situational awareness display; and
   a mission command device that is programmed to
      interpret the input graphical depiction of the unmanned vehicle mission profile,
      generate a data transmission commanding at least one of a new or modified mission for at least one of the one or more unmanned vehicles based on the input graphical depiction, and
      transmit the data transmission based on the input graphical depiction to at least one of the one or more local communication and control consoles for display as a presented graphical depiction,
   the graphical depiction of the unmanned vehicle mission profile indicating a center point of an area of operations for a particular unmanned vehicle, and being depicted as a circular area of a specified radius with respect to the center point, the particular unmanned vehicle being commanded to remain within a distance equal to the specified radius from the center point for separation from the other vehicles.

8. The system of claim 7, wherein the mission command device is further configured to send additional textual information with the data transmission to specify additional instructions to a local operator of the at least one of the one or more local communication and control consoles.

9. The system of claim 7, wherein the mission information device is further configured to receive from a local operator of the at least one of the one or more local communication and control consoles input of a graphical mission profile transmitted to the facility and displayed on the situational awareness display in the facility.

10. The system of claim 7, wherein the mission command device is further configured to receive an acknowledgement of receipt of the data transmission from the at least one of the one or more local communication and control consoles.

11. The system of claim 10, wherein the acknowledgement includes information from a local operator of the at least one of the one or more local communication and control consoles accepting or rejecting the commanded at least one of the new or modified mission.

12. A method for providing traffic separation for unmanned vehicle operations, comprising:
   receiving, with a processor at a remote tracking facility, mission planning and tracking information regarding unmanned vehicle operations from one or more local communication and control consoles, each controlling operations of one or more unmanned vehicles;
   graphically depicting, with the processor, the received mission planning and tracking information for the one or more unmanned vehicles on a consolidated situational awareness display at the remote tracking facility;
   receiving, with the processor, user input of a graphical depiction of an unmanned vehicle mission profile via a user's operating input device at the remote tracking facility for display on the consolidated situational awareness display, the graphical depiction of the unmanned vehicle mission profile for one or more unmanned vehicles providing separation from operations of other vehicles in a vicinity of each of the one or more unmanned vehicles;
   interpreting, with the processor, the input graphical depiction of the unmanned vehicle mission profile;
   generating, with the processor, a data transmission commanding at least one of a new or modified mission for at least one of the one or more unmanned vehicles based on the interpreting of the input graphical depiction; and
   transmitting, with the processor, the generated data transmission based on the interpreting of the input graphical depiction to at least one of the one or more local communication and control consoles for display as a presented graphical depiction and for execution by the at least one of the one or more unmanned vehicles controlled by the at least one of the one or more local communication and control consoles,
   wherein:
      the user's operating input device is configured as a user interactive input device by which a user in the remote tracking facility draws the graphical depiction of the unmanned vehicle mission profile on the consolidated situational awareness display, and
      the graphical depiction of the unmanned vehicle mission profile is a series of points defining a closed area within which a particular unmanned vehicle is commanded to operate exclusively separated from the other vehicles.

13. The method of claim 12, further comprising generating and sending additional textual information with the data transmission to specify additional instructions to a local operator of the at least one of the one or more local communication and control consoles.

14. The method of claim 12, further comprising receiving, with the processor, an input graphical mission profile from a local operator of the at least one of the one or more local communication and control consoles transmitted to the remote tracking facility for display on the situational awareness display for consideration by the user in the remote tracking facility observing the situational awareness display.

15. The method of claim 12, further comprising receiving, with the processor, an acknowledgement of receipt of the data transmission from the at least one of the one or more local communication and control consoles.

16. The method of claim 15, wherein the acknowledgement includes information from a local operator of the at least one of the one or more local communication and control consoles accepting or rejecting the commanded at least one of the new or modified mission.

17. A method for providing traffic separation for unmanned vehicle operations, comprising:
- receiving, with a processor at a remote tracking facility, mission planning and tracking information regarding unmanned vehicle operations from one or more local communication and control consoles, each controlling operations of one or more unmanned vehicles;
- graphically depicting, with the processor, the received mission planning and tracking information for the one or more unmanned vehicles on a consolidated situational awareness display at the remote tracking facility;
- receiving, with the processor, user input of a graphical depiction of an unmanned vehicle mission profile via a user's operating input device at the remote tracking facility for display on the consolidated situational awareness display, the graphical depiction of the unmanned vehicle mission profile for one or more unmanned vehicles providing separation from operations of other vehicles in a vicinity of each of the one or more unmanned vehicles;
- interpreting, with the processor, the input graphical depiction of the unmanned vehicle mission profile;
- generating, with the processor, a data transmission commanding at least one of a new or modified mission for at least one of the one or more unmanned vehicles based on the interpreting of the input graphical depiction; and
- transmitting, with the processor, the generated data transmission based on the interpreting of the input graphical depiction to at least one of the one or more local communication and control consoles for display as a presented graphical depiction and for execution by the at least one of the one or more unmanned vehicles controlled by the at least one of the one or more local communication and control consoles, wherein:
- the user's operating input device is configured as a user interactive input device by which a user in the remote tracking facility draws the graphical depiction of the unmanned vehicle mission profile on the consolidated situational awareness display, and
- the graphical depiction of the unmanned vehicle mission profile indicates a center point of an area of operations for a particular unmanned vehicle, and is depicted as a circular area of a specified radius with respect to the center point, the particular unmanned vehicle being commanded to remain within a distance equal to the specified radius from the center point for separation from the other vehicles.

18. The method of claim 17, further comprising generating and sending additional textual information with the data transmission to specify additional instructions to a local operator of the at least one of the one or more local communication and control consoles.

19. The method of claim 17, further comprising receiving, with the processor, an input graphical mission profile from a local operator of the at least one of the one or more local communication and control consoles transmitted to the remote tracking facility for display on the situational awareness display for consideration by the user in the remote tracking facility observing the situational awareness display.

20. The method of claim 17, further comprising receiving, with the processor, an acknowledgement of receipt of the data transmission from the at least one of the one or more local communication and control consoles.

21. The method of claim 20, wherein the acknowledgement includes information from a local operator of the at least one of the one or more local communication and control consoles accepting or rejecting the commanded at least one of the new or modified mission.

* * * * *